United States Patent
Olson

(10) Patent No.: US 8,661,478 B2
(45) Date of Patent: Feb. 25, 2014

(54) NOISE REDUCTION APPARATUS WITH ISOLATION TRANSFORMERS IN AN INTERNET PROTOCOL TELEVISION SYSTEM

(75) Inventor: Gregory D. Olson, Plano, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 597 days.

(21) Appl. No.: 12/628,004

(22) Filed: Nov. 30, 2009

(65) Prior Publication Data

US 2011/0131617 A1 Jun. 2, 2011

(51) Int. Cl.
*H04N 7/18* (2006.01)
*H04N 7/173* (2011.01)

(52) U.S. Cl.
USPC .............................. 725/82; 725/110; 725/127

(58) Field of Classification Search
USPC .......................................... 725/82, 110, 127
See application file for complete search history.

(56) References Cited

U.S. PATENT DOCUMENTS

| | | | |
|---|---|---|---|
| 5,528,286 A * | 6/1996 | Goolcharan | 348/14.15 |
| 6,057,873 A * | 5/2000 | Adams, III | 725/149 |
| 6,874,093 B2 * | 3/2005 | Bell | 713/300 |
| 7,526,034 B2 * | 4/2009 | Schley-May et al. | 375/258 |
| 7,672,591 B2 * | 3/2010 | Soto et al. | 398/72 |
| 8,259,430 B2 * | 9/2012 | Alkan | 361/119 |
| 2002/0118392 A1 * | 8/2002 | Miyake | 358/3.03 |
| 2004/0073942 A1 * | 4/2004 | Park et al. | 725/124 |
| 2005/0141851 A1 * | 6/2005 | Nakayama et al. | 386/46 |
| 2005/0195038 A1 | 9/2005 | Neenan et al. | |
| 2006/0107295 A1 * | 5/2006 | Margis et al. | 725/81 |
| 2006/0282264 A1 | 12/2006 | Denny et al. | |
| 2007/0277205 A1 * | 11/2007 | Grannan | 725/80 |
| 2008/0205897 A1 | 8/2008 | Neenan et al. | |
| 2009/0006626 A1 * | 1/2009 | Yamagishi | 709/226 |
| 2009/0096654 A1 * | 4/2009 | Zhu et al. | 341/155 |
| 2010/0131970 A1 * | 5/2010 | Falcon | 725/19 |

* cited by examiner

*Primary Examiner* — Pankaj Kumar
*Assistant Examiner* — Franklin Andramuno
(74) *Attorney, Agent, or Firm* — Guntin & Gust, PLC; Andrew Gust

(57) ABSTRACT

A residential gateway includes an Internet Protocol television (IPTV) network communication port and a first isolation transformer circuit. The IPTV network communication port is configured to receive a signal from an ITPV network. The first isolation transformer circuit is in communication with the IPTV network communication port. The isolation transformer is configured to receive the signal from the IPTV network communication port, and to transform a ground of the signal to float at a ground potential of a power source of the residential gateway.

18 Claims, 6 Drawing Sheets

NOISE REDUCTION APPARATUS WITH ISOLATION TRANSFORMERS IN AN INTERNET PROTOCOL TELEVISION SYSTEM

FIELD OF THE DISCLOSURE

The present disclosure generally relates to communications networks, and more particularly relates to a noise reduction apparatus with isolation transformers in an Internet Protocol television system.

BACKGROUND

An Internet Protocol television (IPTV) service provider can transmit an IPTV signal to a user via a central office, a serving area interface, and a residential gateway. The IPTV service provider can offer the user a variety of different television programs and/or movies. For example, the IPTV service provider can supply users with real-time television programs that are typically available for the users to watch only at a specific date and time. The IPTV service provider can also offer the users on-demand movies that are available for an extended amount of time and that are provided to the users upon request of the on-demand movie.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
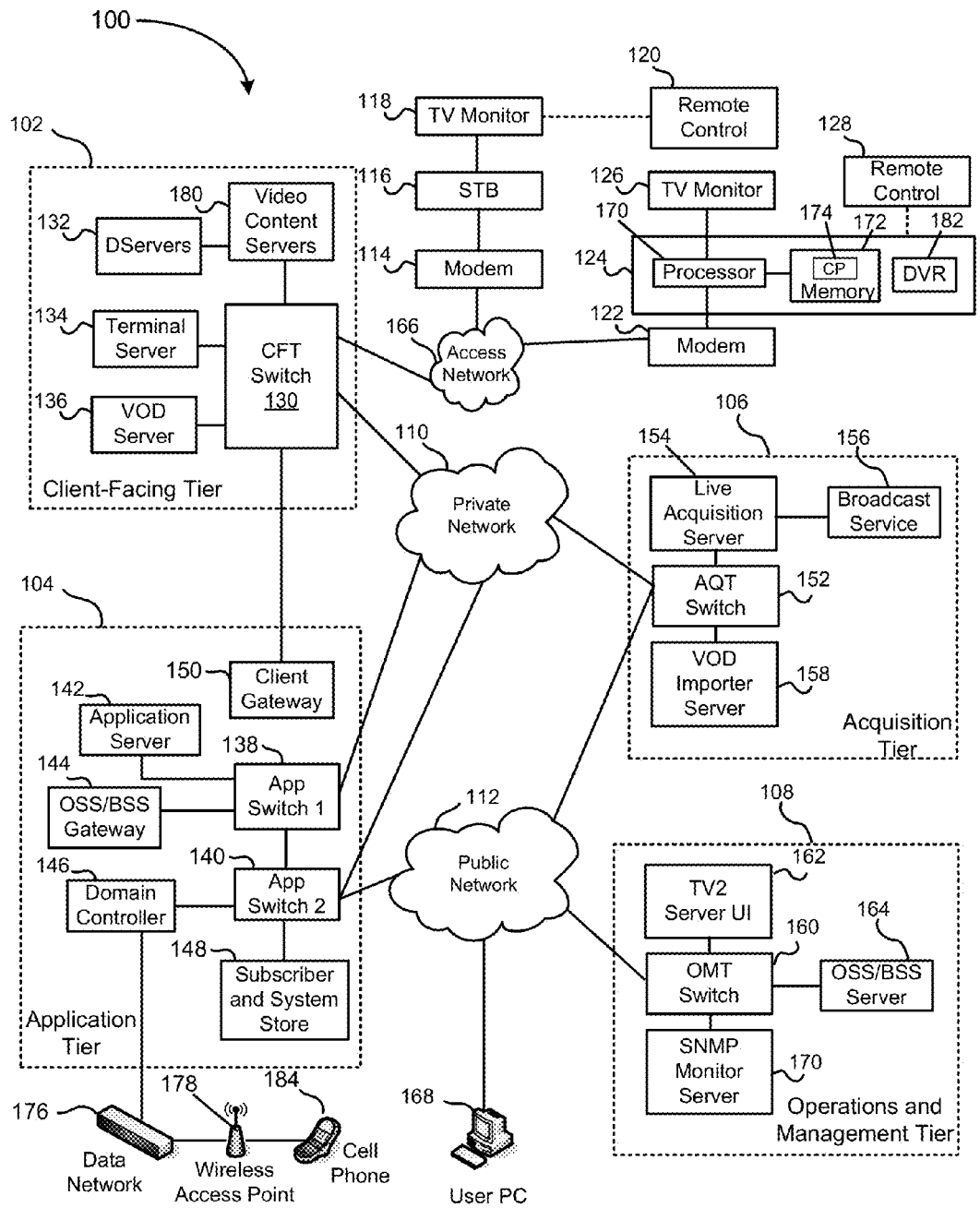
FIG. 1 is a block diagram of an Internet Protocol Television (IPTV) system.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modems such as a first modem 114 and a second modem 122 can be coupled to the private access network 166. The client-facing tier 102 can communicate with a first representative set-top box device 116 via the first modem 114 and with a second representative set-top box device 124 via the second modem 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modems 114 and 122 via fiber optic cables. Alternatively, the modems 114 and 122 can be digital subscriber line (DSL) modems that are coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® TV IPTV Edition.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device 124 can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include tuners that receive and decode television programming information for transmission to the display devices 118 and 126. Further, the set-top box devices 116 and 124 can include a set-top box processor 170 and a set-top box memory device 172 that is accessible to the set-top box processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support/billing systems and support (OSS/BSS) gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes OSS data, as well as BSS data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the first set-top box device 116 access to IPTV content and VOD content. If the client gateway 150 cannot verify subscriber information for the first set-top box device 116, such as because it is connected to a different twisted pair, the client gateway 150 can deny transmissions to and from the first set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 166 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the D-servers 132, and the CFT switch 130 can communicate the television content to the modems 114 and 122 via the private access network 166. The set-top box devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer (PC) 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access point 178 can communicate with user wireless devices such as a cellular telephone 184.

In a particular embodiment, the set-top box devices can include a set-top box computer program 174 that is embedded within the set-top box memory device 172. The set-top box computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alphanumeric identifier of the second set-top box device, with any other data that is suitable for associating second set-top box device with a user account, or with any combination of these.

Figure 2:
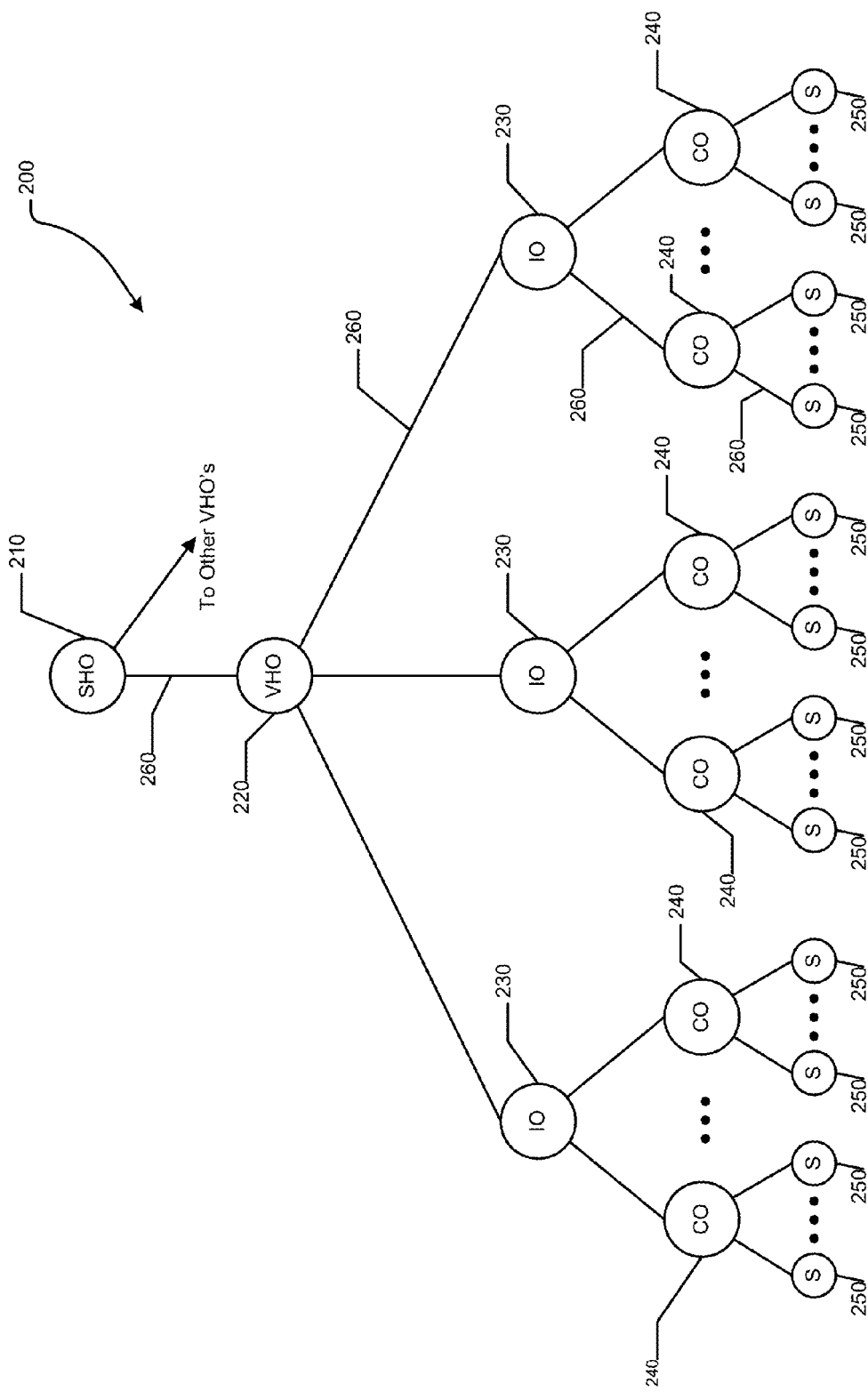
FIGS. 2 and 3 are block diagrams of an embodiment of an IPTV network.

FIG. 2 shows one example embodiment of a television distribution system or network 200, using IPTV technology in this example but not limited thereto, adapted to provide, among other things, the live television content features of the disclosed subject matter. The network 200 may include a super hub office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and subscribers 250, who may be located in single or multiple dwelling units. In one example embodiment, the network 200 may be connected through a plurality of high speed communication links 260 using physical transport layers such as fiber, cable, twisted pair, air, or other media.

In one example embodiment of the IPTV video delivery system, the SHO 210 distributes content to one or more VHOs 220 which may be spread across a wide geographic territory, such as an entire country. The SHO 210 may, for example, be in a central location for acquisition and aggregation of national-level broadcast television (or linear) programming. A redundant SHO 210 may be provided for backup in case of failure. The SHO 210 may also provide the central point of live television content acquisition and insertion into the IPTV network. Linear programming may be received at the SHO 210 via satellite and processed for delivery to the VHO 220. Live television content may be received from various sources and processed/encoded to codec and bit-rate requirements for the communication network for transmission to the VHO 220 over the high speed communication links. The VHOs 220 are the video distribution points within each DMA or geographic region.

Figure 3:
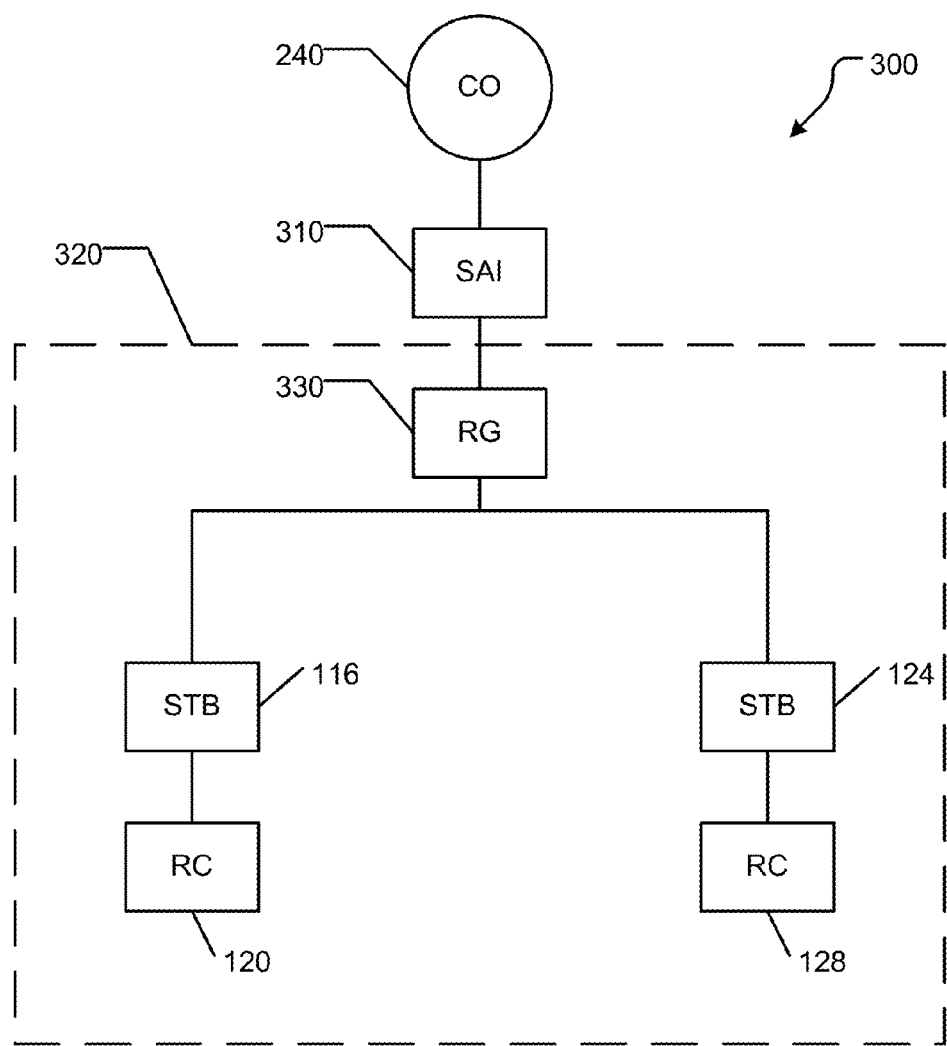

FIG. 3 shows an exemplary network architecture 300 between the CO 240 and customer premises equipment (CPE) 320 of the subscriber 250 shown in FIG. 2. A serving area interface (SAI) or video ready access device (VRAD) 310 may be connected to the CO 240. SAI 310 may, for example, be located in a weather-proof enclosure proximate the subscriber 250 premises, and may include fiber-to-the-node (FTTN) equipment, such as a digital subscriber line access multiplexer (DSLAM). FTTN equipment may also be located in the CO 240. The customer premises equipment (CPE) 320 includes, for example, a network interface device (not shown) and a residential gateway (RG) 330, with a built-in very-high-bit-rate digital subscriber loop (VDSL) modem or optical network termination (ONT). In either case, the RG 330 may be connected to the rest of the home set-top box devices 116 and 124 via an internal network such as an Ethernet. The set-top box devices 116 and 124 each have an associated remote control device 120 and 128 which provides data entry to the set-top box devices to control the IPTV selections from the IPTV data streams.

Figure 4:
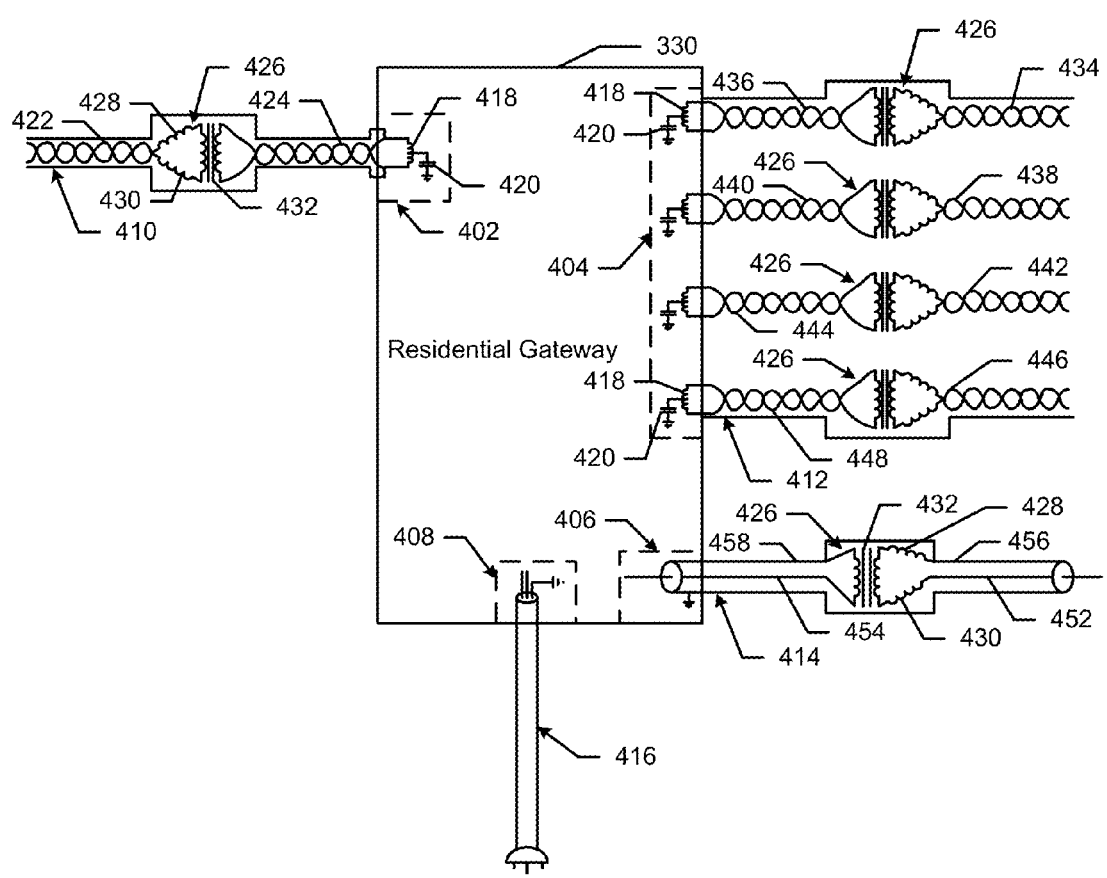
FIG. 4 is a schematic diagram of a residential gateway, and cables having an isolation circuit.

FIG. 4 shows the residential gateway 330 including communication ports 402, 404, and 406, and power port 408. The communication port 402 can be an RJ 11 communication port, and can connect with the SAI 310 via a cable such as a twisted pair telephone wire 410. The communication port 404 can be an RJ 45 communication port and can connect to the set-top box device 116 or to a computer via an Ethernet cable 412. The communication port 406 can be a coaxial cable communication port and can connect to the set-top box device 124 via a coaxial cable 414. The power port 408 is connected to a power cable 416, which in turn includes a first terminal, a second terminal, and a ground terminal. Each twisted pair in the telephone cable 410 and in the Ethernet cable 412 terminates in an inductor 418 and a capacitor 420. Each inductor 418 has first and second terminals connected to a respective wire of a twisted pair. Each capacitor 420 includes a first terminal that is preferably connected to the center of a winding of the inductor 418, and a second terminal connected to ground. The communication port 406 includes a ground terminal. The residential gateway 330 can be utilized to transmit IPTV signals. In another embodiment, the residential gateway 330 can be a digital subscriber line (DSL) modem that can be utilized to transmit data via an asymmetric digital subscriber line (ADSL) protocol, a high bit rate digital subscriber line (HDSL) protocol, or the like.

The telephone cable 410 includes segments 422 and 424 and an isolation circuit 426 located between the segments. The isolation circuit 426 includes a first inductor 428, a second inductor 430, and a transformer 432. The first inductor 428 includes a first terminal connected to a first wire of the segment 422, and a second terminal. The second inductor 430 includes a first terminal connected to a second wire of the segment 422, and a second terminal. The transformer 432 includes a primary winding and a secondary winding. The primary winding of the transformer 432 includes a first terminal connected to the second terminal of the first inductor 428, and a second terminal connected to the second terminal of the second inductor 430. The secondary winding of the transformer 432 includes a first terminal connected to a first wire of the segment 424, and a second terminal connected to a second wire of the segment.

The Ethernet cable 412 includes four isolation circuits 426 and segments 434 and 436, 438 and 440, 442 and 444, and 446 and 448. One of the isolation circuits 426 is connected between the segments 434 and 436 similar to the isolation circuit and the segments 422 and 424 of the telephone cable 410. Another isolation circuit 426 is connected between the segments 438 and 440 similar to the isolation circuit and the segments 422 and 424 of the telephone cable 410. An additional isolation circuit 426 is connected between the segments 442 and 444 similar to the isolation circuit and the segments 422 and 424 of the telephone cable 410. Another isolation circuit 426 is connected between the segments 446 and 448 similar to the isolation circuit and the segments 422 and 424 of the telephone cable 410.

The coaxial cable 414 includes center conductors 452 and 454, shields 456 and 458, and the isolation circuit 426. The conductor 452 is connected to the first terminal of the second inductor 430. The conductor 454 is connected to the second terminal of the secondary winding of the transformer 432. The shield 456 is connected to the first terminal of the first inductor 428. The shield 458 is connected to the first terminal of the secondary winding of the transformer 432.

The telephone cable 410 can be plugged into the communication port 402 of the residential gateway 330 to provide signals from the IPTV network 100 to the residential gateway. The Ethernet cable 412 can be plugged into the communication port 404 of the residential gateway 330, and the coaxial cable 414 can be plugged into the communication port 406 of the residential gateway to provide the signals to the set-top box devices 116 and 124. Noise can be induced in the telephone cable 410, the Ethernet cable 412, and the coaxial cable 414 as the signals travel along the cables. The noise can be common-mode noise, which is noise that travels in the same direction along each wire in the telephone cable 410, the Ethernet cable 412, and the coaxial cable 414. The noise induced along the telephone cable 410, the Ethernet cable 412, and the coaxial cable 414 can inhibit operation of the residential gateway 330, such as by interfering with the ability of the residential gateway to synchronize with the SAI 310, the set-top box devices 116 and 124, and the like.

The common-mode inductors 428 and 430 in the isolation circuits 426 combine to filter out the high frequency common-mode noise along the segments 422 and 424 of the telephone cable 410 and the segments 434 and 436, 438 and 440, 442 and 444, and 446 and 448 of the Ethernet cable 412. Additionally, the common-mode inductors 428 and 430 in the isolation circuits 426 combine to filter out high frequency common-mode noise along the conductors 452 and 454 and the shields 456 and 458 of the coaxial cable 414. The common-mode inductors 428 and 430 can preferably provide high impedance to the high frequency noise, such as thirty to fifty decibels, while not providing any impedance to the desired signal.

The grounds of the communication ports 402, 404, and 406, and the power port 408 are all preferably connected to the same ground plane within the residential gateway 330. However, when the residential gateway 330 receives a signal from the IPTV network 100 along the telephone cable 410 and/or a signal from the set-top box device 116 along the Ethernet cable 412 or the coaxial cable 414, the grounds of the signals can be at different potentials than the ground potential at the power port 408. Additionally, each signal received at the residential gateway 330 can have a ground potential at the potential of the device that sent the signal. For example, the signal received at the communication port 402 can have a ground potential of the SAI 310, the signal received at the communication port 404 can have a ground potential of the set-top box device 116, and both of these ground potentials can be different than the ground potential of the power port 408. Operation of the residential gateway 330 can be inhibited based on the different ground potentials being connected to the same ground plane within the residential gateway.

The isolation transformers 432 of the isolation circuits 426 in the telephone cable 410, the Ethernet cable 412, and the coaxial cable 414 can isolate the ground potential of the signal on one side of the transformer from the ground potential on the other side of the transformer. The isolation transformers 432 can be unity gain transformers, such that the signal is not amplified or decreased through the isolation transformer. The ground potentials of the signal on each side of the transformer 432 can be isolated based on the primary and secondary windings of the isolation transformers not being connected together and that a current in the primary winding induces a corresponding current on the secondary winding. Thus, the ground potential on one side of the transformer 432 may be different than the ground potential on the other side of the transformer. Therefore, the ground potential of the signals on one side of the telephone cable 410, the Ethernet cable 412, and the coaxial cable 414 can float in relation to the grounds of the devices connected to the cables, and the ground potential of the signals at the communication ports 402, 404, and 406 can preferably float to the ground of the power port 408. Thus, all of the grounds connected to the ground plane within the residential gateway 330 can have the same ground potential, such that the residential gateway does not fail.

Figure 5:
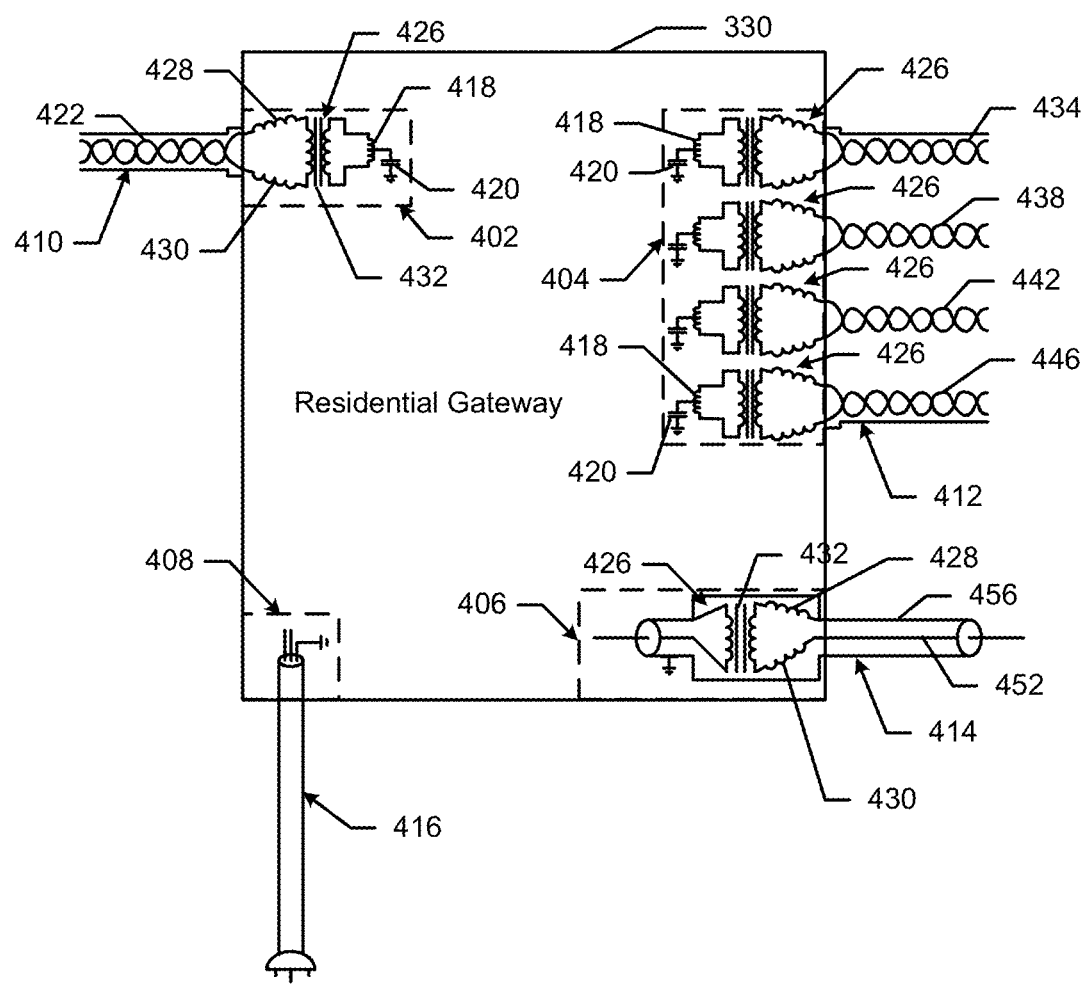
FIG. 5 is a schematic diagram of a residential gateway having the isolation circuit.

FIG. 5 shows another embodiment of the residential gateway 330 where the isolation circuits 426 are located within the residential gateway and not within the telephone cable 410, the Ethernet cable 412, and/or the coaxial cable 414. The isolation circuits 426 within the residential gateway 330 preferably operate similarly as discussed above for the isolation circuits within the telephone cable 410, the Ethernet cable 412, and the coaxial cable 414.

Figure 6:
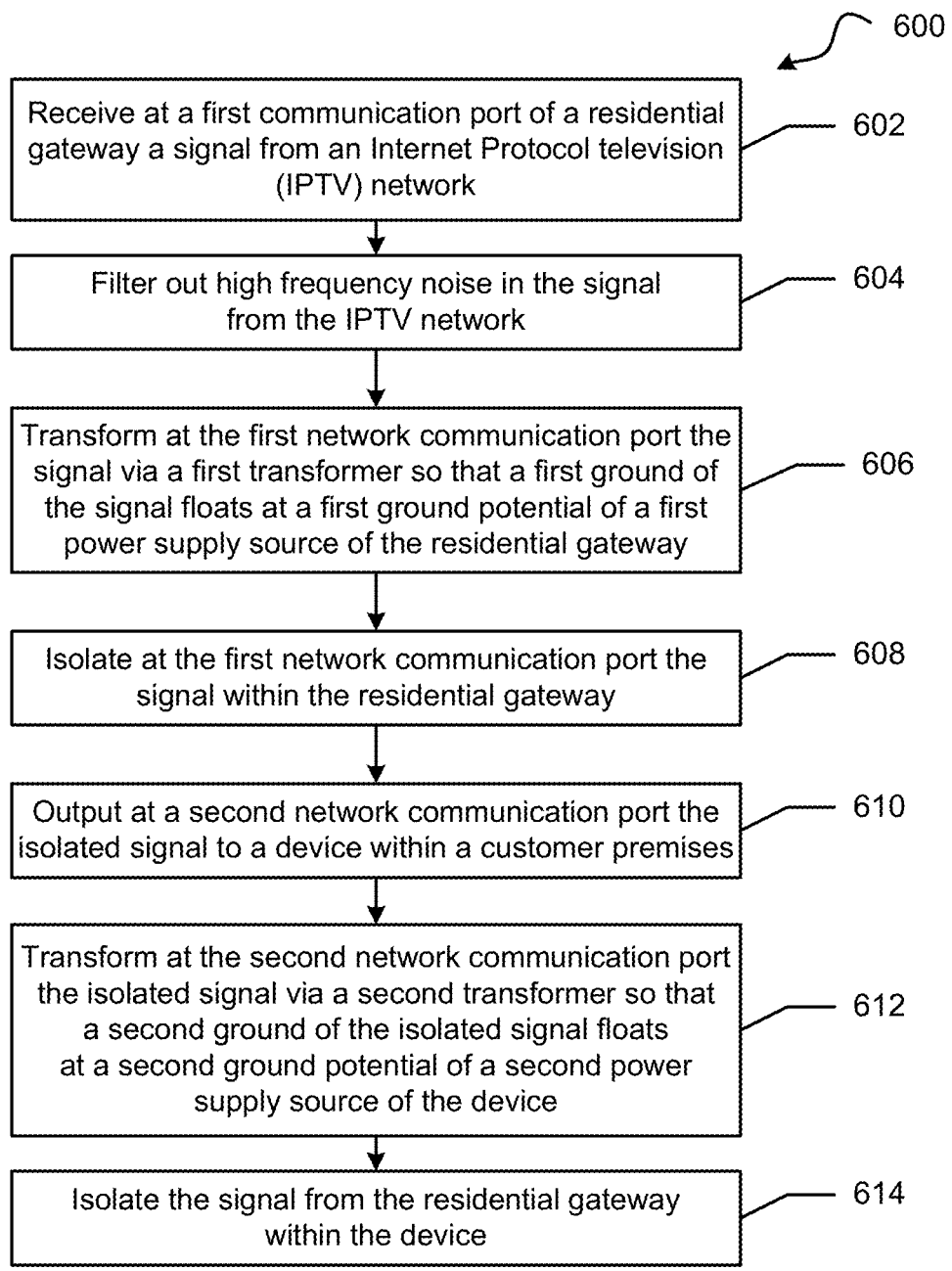
FIG. 6 is a flow diagram of a method for isolating a signal of the IPTV network from the ground plane of the residential gateway.

FIG. 6 shows a flow diagram of alternative method 600 for isolating a signal of the IPTV network from the ground plane of the residential gateway 330. At block 602, a signal from the IPTV network is received at a first communication port of a residential gateway. The first communication port can be an RJ 45 communication port, an RJ 11 communication port, a coaxial communication port, and the like. High frequency noise in the signal from the IPTV network is filtered out at block 604. The high frequency noise can be common-mode noise, and the common-mode noise can be filtered via common-mode inductors.

At block 606, the signal is transformed at the first network communication port via a first transformer so that a first ground of the signal floats at a first ground potential of a first power supply source of the residential gateway. The first signal is isolated at the first network communication port within the residential gateway at block 608. At block 610, the isolated signal is output at a second network communication port to a device within a customer premises. The device can be a set-top box, a computer, and the like. The isolated signal is transformed at the second communication port via a second transformer so that a second ground of the isolated signal floats at a second ground potential of a second power supply source of the device at block 612. At block 614, the signal is again isolated from the residential gateway within the device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A gateway device, comprising:
   a transformer;
   a first inductor for directly inductively coupling a first internet protocol television differential communication signal to a first input of the transformer;
   a second inductor for directly inductively coupling a second internet protocol television differential communication signal to a second input of the transformer; and
   a third inductor for directly inductively coupling a first output of the transformer to a capacitor via a first terminal and a center winding of the third inductor and for directly inductively coupling a second output of the transformer to the capacitor via a second terminal and the center winding of the third inductor.

2. The gateway device of claim 1, wherein the first inductor and the second inductor perform filtering of high frequency noise from the first internet protocol television differential communication signal and the second internet protocol television differential communication signal.

3. The gateway device of claim 2, wherein the high frequency noise is common-mode noise.

4. The gateway device of claim 1, wherein the transformer is a unity gain transformer.

5. The gateway device of claim 1, wherein the first internet protocol television differential communication signal and the second internet protocol television differential communication signal are received via a twisted pair of wires.

6. The gateway device of claim 1 wherein the gateway device comprises one of an RJ 45 communication port, an RJ 11 communication port, or a coaxial communication port.

7. A device comprising:
   a transformer;
   a first inductor for directly inductively coupling a first internet protocol television differential communication signal to a first input of the transformer;
   a second inductor for directly inductively coupling a second internet protocol television differential communication signal to a second input of the transformer; and
   a third inductor for directly inductively coupling a first output of the transformer to a common mode signal via a first terminal and a center winding of the third inductor and for directly inductively coupling a second output of the transformer to the common mode signal via a second terminal and the center winding of the third inductor.

8. The device of claim 7 wherein the transformer is a unity gain transformer.

9. The device of claim 7, wherein the common mode signal is further coupled to a first terminal of a capacitor and wherein a second terminal of the capacitor is coupled to ground.

10. The device of claim 7 wherein the device comprises one of an RJ 45 communication port, an RJ 11 communication port, or a coaxial communication port.

11. A method, comprising:
    receiving, by a gateway device, a first internet protocol television differential communication signal and a second internet protocol television differential communication signal;
    directly inductively coupling, by the gateway device, the first internet protocol television differential communication signal to a first input of a transformer via a first inductor;
    directly inductively coupling, by the gateway device, the second internet protocol television differential communication signal to a second input of the transformer via a second inductor;
    transforming, by the gateway device, the first internet protocol television differential communication signal and the second internet protocol television differential communication signal via the transformer to generate a first isolated differential signal and a second isolated differential signal; and
    directly inductively coupling, by the gateway device, to a capacitor the first isolated differential signal via a first terminal and a center winding of a third inductor and the second isolated differential signal via a second terminal and the center winding of the third inductor to generate a noise filtered, common mode output for processing at the gateway.

12. The method of claim 11, further comprising:
    outputting, by the gateway device, the noise filtered, common mode output to a device within a customer premises; and
    isolating, by the gateway device, at the gateway device from a ground potential within the customer premises via a second transformer.

13. The method of claim 11 wherein the first inductor performs filtering of first high frequency noise in the first internet protocol television differential communication signal and wherein the second inductor performs filtering of second high frequency noise in the second internet protocol television differential communication signal.

14. The method of claim 11 wherein the transformer is a unity gain transformer.

15. The method of claim 13 wherein the first high frequency noise and the second high frequency noise comprise common-mode noise.

16. The method of claim 11 wherein the noise filtered, common mode output is generated for one of an RJ 45 communication port, an RJ 11 communication port, or a coaxial communication port.

17. The gateway device of claim 1, wherein a primary winding of the transformer is directly inductively coupled to the first internet protocol television differential communication signal and the second internet protocol television differential communication signal.

18. The device of claim 7, wherein a primary winding of the transformer is directly inductively coupled to the first internet protocol television differential communication signal and the second internet protocol television differential communication signal.

\* \* \* \* \*